UNITED STATES PATENT OFFICE 2,624,712

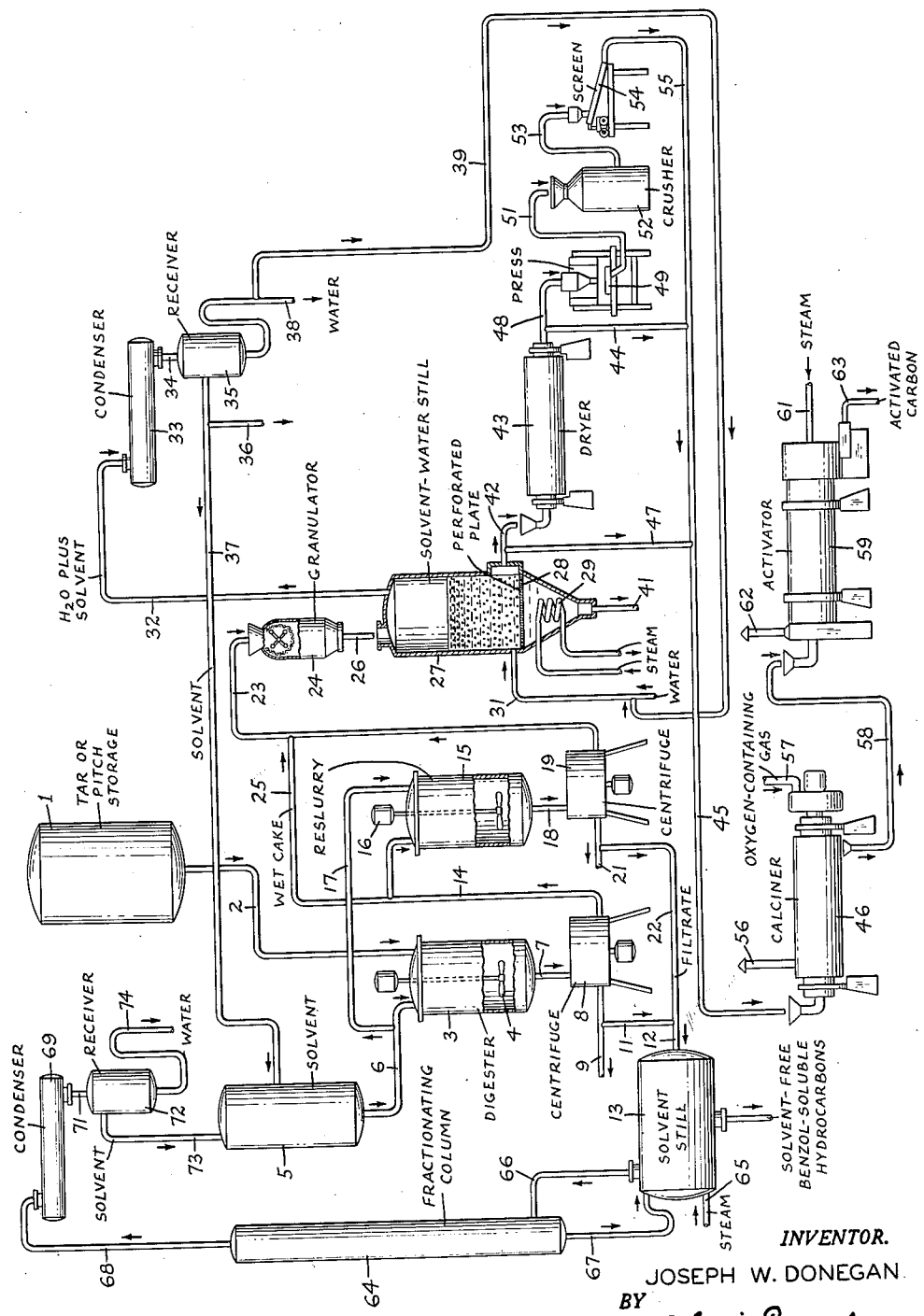

METHOD OF PROCESSING CARBONACEOUS MATERIALS FOR SUBSEQUENT ACTIVATION TREATMENT

Joseph W. Donegan, New Brunswick, N. J., assignor to Allied Chemical & Dye Corporation, New York, N. Y., a corporation of New York Application February 9, 1951, Serial No. 210,211

13 Claims. (Cl. 252—421)

This invention relates to the manufacture of activated carbons from tars and pitches and more particularly refers to a new and improved method of processing these carbonaceous materials for subsequent activation treatment.

In the production of activated carbon suitable for use for decolorizing, deodorizing, water purification, and gas and vapor adsorption from tars and pitches as described in my co-pending application Serial No. 18,712, filed April 2, 1948, now Patent 2,549,298, the desired solid carbonaceous material is separated from the tars and pitches and subsequently processed so as to put it in condition adaptable for activation. A specific method, as described therein, for the processing of these carbonaceous materials for activation involves the following steps:

(a) Adding a solvent such as benzol, xylol, toluol or crude heavy solvent naphthas to the tar or pitch so as to obtain a mixture comprising a liquor of the solvent and soluble components of the tar or pitch plus a finely comminuted suspension of the components insoluble in the liquor.

(b) Separating the solids from the liquor by filtration, centrifuging or sedimentation. The separated solids comprise solid carbonaceous material analyzing approximately 35–40% of benzol-soluble hydrocarbons on a solvent-free basis.

(c) Reslurrying or washing the separated solids so as to increase the benzol-insoluble content thereof, followed by filtering of these solids from the wash liquor. The resultant filter cake comprises a wet mass of pulverulent solids containing about 25–35% of occluded wash liquor.

(d) Drying the solids to evaporate the solvent at a low temperature under carefully controlled conditions so as to avoid coalescence or fluxing. The dried solids are a finely pulverulent dust, substantially all passing a 325 mesh sieve.

(e) Lightly compacting the dry pulverulent dust by passing it through a differential-speed roll mill to produce a flake.

(f) Granulating the flake to provide low-density grain of, e. g., 10 to 20 mesh size.

(g) If the final activated product is to be used for gas adsorption or solvent recovery operations, the dry pulverulent dust or the granulated flake is briquetted in compressing machines at pressures ranging from 5,000 to 50,000 pounds per square inch and the briquettes then crushed and sized.

The foregoing procedure for the preparation of solid carbonaceous substances obtained from tars and pitches preliminary to activation has been successfully practiced. The present invention is especially concerned with improvements in the preparation of these carbonaceous solids preliminary to calcination and activation into activated carbon.

More particularly, this invention accomplishes forming granules from the wet mass of pulverulent solids containing occluded liquor thereby making unnecessary compacting and granulation of the finely pulverulent dry solids. Efficient removal of solvent from the granules and more complete recovery of the thus removed solvent are additional advantages. In addition, considerably less dust is formed during the operation thereby reducing the dust nuisance and minimizing the explosion hazard.

An object of the present invention is to provide an efficient method for treating solid carbonaceous materials derived from tars and pitches to put them in condition adaptable for activation.

Another object is to provide a method for preparing solid carbonaceous materials derived from tars and pitches in form suitable for activation whereby dust nuisance and explosion hazard therefrom are eliminated.

A further object of this invention is to provide a method for more completely and economically recovering solvent from the carbonaceous solids in the preparation of these materials as derived from tars and pitches for the production of activated carbons.

A still further object is to provide a method for preparing strong grain from carbonaceous materials derived from tars and pitches preliminary to conversion into activated carbons whereby the steps of flaking and granulation are eliminated.

Another object of this invention is to provide a method for obtaining solvent-free carbonaceous solids in physical form which will feed freely through the hoppers and chutes of automatic tableting and compression machines.

Other objects and advantages of the present invention will be apparent from the following description and accompanying drawing.

A preferred method for the preliminary treatment of tars and pitches in accordance with the invention involves mixing a solvent with a tar or pitch, separating carbonaceous solid materials insoluble in the mixture from the liquor, washing the solids with a solvent immiscible with water, separating the washed solids from the wash liquor, granulating the solvent-wet solids, adding to the granular solvent-wet solids an amount of water sufficient to completely envelop the individual grains during subsequent removal of at least a major portion of the solvent from the granular solvent-wet solids, heating the solids-water mixture to a temperature not substantially in excess of 100° C. to effect vaporization of at least a major portion of the solvent and thereby render the grain hard and non-coalescent and of higher fusion point, condensing the evolved vapors of solvent and water resulting from the heating, separating the condensate into a water layer and a solvent layer, returning the solvent layer for further use in the process, and draining surplus water from the water-wet grain after removal of solvent therefrom.

One specific embodiment of the present invention comprises mixing a solvent with a tar or pitch, separating carbonaceous solid materials insoluble in the mixture from the liquor, washing the solids with a solvent immiscible with water, separating the washed solids from the wash liquor, granulating the solvent-wet solids, adding to the granular solvent-wet solids a large amount of water sufficient upon subsequent heating of the solids-water mixture to pass off as vapors with the occluded solvent and leave behind as residue the solids surrounded by liquid water, heating the solids-water mixture to a temperature not substantially in excess of 100° C. to effect vaporization of the occluded solvent and concomitantly a portion of the contained water, terminating the vaporization after substantially all the solvent has been removed from the solids but before all the water has been vaporized therefrom, condensing the evolved vapors of solvent and water resulting from the heating of the solids-water mixture, separating the condensate into a water layer and a solvent layer, returning the water layer for admixture with granular solvent-wet solids, returning the solvent layer for admixture with tar or pitch, draining water from the water-solids residue resulting from vaporization of solvent therefrom, drying the solids drained of water, heating the dried solids in the presence of oxygen-containing gas at temperatures sufficiently high to char the solids while maintaining the temperature sufficiently low during such heating so that at least a substantial proportion of the solid remains in an unfused condition, and continuing heating of the solids until an infusible activatable char is obtained.

The accompanying drawing is a diagrammatic flow sheet illustrating the operation of the present invention.

Referring to the drawing, the charging stock for the process contained in tank or bin 1 may be coal tar resulting from the destructive distillation of coals, or water-gas tar or an oil-gas tar resulting from the pyrolysis of petroleum at high temperatures to produce predominantly gas, or pitches of these tars, or mixtures of these tars and pitches. Coal tar and coal-tar pitch derived therefrom are heavy hydrocarbons which may be termed a pyrogenous hydrocarbon condensate resulting from the destructive distillation of coals. Water-gas tar and water-gas tar pitch derived therefrom and oil-gas tar and oil-gas tar pitch derived therefrom are heavy hydrocarbons which may be termed a pyrogenous hydrocarbon condensate resulting from the pyrolysis of petroleum at high temperatures to produce predominantly gas. Such tars and pitches contain benzol-insoluble hydrocarbons and benzol-soluble hydrocarbons in varying proportions ranging from about 5% to 60% by weight of benzol-insoluble hydrocarbons and from 40% to 95% by weight of hydrocarbons soluble in benzol. Charging stock tar or pitch from tank 1 is pumped through line 2 into digester chamber 3, which latter may be a conventionally closed vessel equipped with motor driven stirrer 4, until digester 3 is filled to about ⅓ its volumetric capacity. Solvent from solvent tank 5 is added to the pitch in digester chamber 3 through line 6 and the mixture constantly agitated by means of stirrer 4. Satisfactory solvents are predominantly aromatic in character and are typified by the relatively low boiling coal tar distillates, boiling within the range of 80° C. to 250° C., such as xylol, benzol, toluol and crude heavy solvent naphthas. Generally, the ratio of solvent to pitch will be within the range of 2 to 10 volumes of solvent per volume of pitch. Digestion is desirably carried out at relatively low temperatures from about room temperature to 150° C. Heat may be supplied to the solvent-tar mixture undergoing digestion by means of a closed steam coil, not shown in the drawing, in chamber 3 or the interposition of a heating coil in line 6 for preheating solvent entering chamber 3. As a result of mixing the solvent with tar or pitch, the soluble bitumens go into solution in the solvent and the insoluble constituents separate out as a solid, finely dispersed solid phase and remain in suspension as a finely divided, easily filtered suspensoid. Separation of the insoluble components from the mixture may readily be accomplished by conventional methods, such as filtration, centrifuging and sedimentation.

After digestion the mixture from chamber 3 flows through line 7 into conventional centrifuge 8, wherein the mixture is separated into a filtrate composed of solvent plus soluble hydrocarbons extracted from the tar or pitch and a wet filter cake comprising finely pulverulent carbonaceous solids and occluded liquor containing soluble hydrocarbons and solvent. Although it is virtually impossible to remove all the occluded liquor from the solid carbonaceous material by filtration or sedimentation, the operation should desirably be conducted so that the wet filter cake contains not more than about 40% by weight of liquor. Filtrate comprising solvent and dissolved soluble hydrocarbons may be withdrawn from the system through line 9 or preferably sent through lines 11 and 12 to solvent still 13 for separation and recovery of purified solvent.

In order to effect further reduction of the benzol-soluble content of the separated carbonaceous material and correspondingly increase its benzol-soluble content, the wet filter cake is transferred through line 14 into reslurry chamber 15, similar in design and construction to chamber 3 and also equipped with stirrer 16. An additional quantity of any one of the suitable solvents, usually the same solvent as used in the primary digestion, is admixed with the wet filter cake by the introduction of the solvent through line 17 into chamber 15. The quantity of solvent may vary from 1 to 8 volumes of solvent per volume of wet filter cake, dependent to a large extent upon the benzol-soluble content of the primary filter cake. If desired, removal of soluble hydrocarbons from the wet filter cake may be accomplished by repeated reslurrying operations with intermediate separation of the solvent liquor from the insoluble carbonaceous solids, but ordinarily only one reslurrying operation, wherein a mixture of solvent and filter cake is agitated for about 1 to 2 hours at a temperature of about 90°–100° C., is necessary.

As an alternative method of "washing,"

which term is intended to include reslurrying with solvent, the filter cake may be washed with the solvent by flowing a stream of the solvent through the solvent-wet filter cake in a manner conventional for washing filter cake.

The mixture of carbonaceous solids and solvent is withdrawn from the bottom of chamber 15 through line 18 and passed into conventional centrifuge 19, wherein it is separated into a filtrate comprising solvent and dissolved hydrocarbons and a moist filter cake containing occluded wash liquor. Filtrate from centrifuge 19 may be withdrawn from the system through line 21 or directed through lines 22 and 12 to solvent still 13 for recovery and reuse of the solvent. If desired, the filtrate from centrifuge 19 may be employed as the solvent for admixture with the tar or pitch in digester 3.

Filter cake in the form of moist lightly-coherent pulverulent particles is formed into granules by passing it via line 23 into granulator 24, which granulation operation consists essentially in pressing the moist filter cake through a screen. Present commercially available granulators may be utilized for this purpose. The granular product obtained from granulator 24 is in the form of irregularly shaped granules having a very narrow particle size range, preferably a screen giving about 10–20 mesh size granules should be used. The granular product is relatively soft and plastic, and while the individual grains do not tend to adhere and cohere at room temperature, at elevated temperatures a strong tendency to flow together exists. However, it is necessary that this grain be heated in order to accelerate the elimination of solvent, and yet it is likewise necessary to retain the material in the form of discrete particles.

In certain instances, particularly if the wet filter cake from centrifuge 8 is relatively low in benzol-soluble hydrocarbons, subsequent reslurrying or washing of the filter cake for further removal of the benzol-soluble hydrocarbons may be unnecessary. In this event, reslurrying chamber 15 may be by-passed and the wet filter cake from line 14 sent directly through line 25 into granulator 24.

If it is desired to produce a harder grain than normally obtained by directly pressing the moist filter cake through a screen, this may be accomplished by precompressing the moist filter cake prior to granulation. Conventional oil presses, not shown in the drawing, an example of which is the commercially-known Carver oil press, may be employed for this purpose. The pressure of compression may vary from 1000–15,000 p. s. i. dependent on the degree of hardness desired. During the compression liquor is expressed from the moist filter cake thereby reducing the amount of solvent required to be subsequently removed. Precompression prior to granulation provides a means of regulating the density, hardness and strength of the granular product.

The next step in the operation involves the removal of solvent from the grains of carbonaceous material formed in granulator 24. It is essential that coalescence of the granular carbonaceous solids be avoided during the elimination of solvent therefrom or else an unsatisfactory product will result. I have discovered that coalescence of the granular solids can be prevented by surrounding the individual grains with water during the period when the solvent is being volatilized from the granular material. In practice, removal of solvent from granular material may be accomplished by introducing the granular solids via line 26 into a solvent-water still 27 which latter may be a vertical vessel having a conical bottom with a perforated plate 28 near its bottom on which the granular material rests. Water is introduced into still 27 through line 31 in an amount sufficient to provide a continuous envelope around all of the individual grains of solvent-wet solids. It is relatively unimportant that an excess amount of water be added, but most important for the success of the operation that sufficient water remain in the still to surround the granular particles during removal of at least a major portion, more than 50%, of the solvent. Although the amount of water may be varied within wide limits, in practice I have found three volumes of water per volume of granular material will afford protection to the grains during its transition from a soft, plastic state to a hard condition. Heat may be applied to the water-solids mixture in a conventional manner, for example, by indirect contact with heating coil 29 or by direct contact with a heated fluid. A mechanical stirrer, not shown, may desirably be employed to agitate the mass being processed. Upon the application of heat to the water-solids mixture, solvent and water vapors evolved from still 27 are condensed and collected in receiver 35 in which a separation into two layers takes place. In a preferred method of operation, vaporization is continued until substantially all the solvent is removed, the grains becoming progressively harder and stronger as solvent is eliminated. This may be readily ascertained by periodically testing samples of condensate removed from the solvent-water still 27—in fact a visual inspection of such samples is ordinarily sufficient to determine whether substantially all the solvent has been separated from the solids. High temperatures in still 27 should be avoided and preferably the temperature therein should not be greatly in excess of 100° C. In fact, if the grain being processed be particularly susceptible to fusion, it may be desirable to subject the still to a vacuum in order to effect solvent elimination well below 100° C. On no account should all of the water be vaporized from the granular solids as long as there is any possibility that they are sufficiently soft and plastic to coalesce. The liquid water surrounding the individual grains functions as a protective medium throughout removal of the major portion of the solvent which is a critical period because the granular solids are soft and prone to coalesce. After the major portion of the solvent has been eliminated and the water drained from the still, the grain is hard and non-adherent and is sufficiently refractory to permit further treatment in the absence of water to eliminate any solvent residues.

Solvent vapors and water vapor flowing through line 32 are condensed in condenser 33 and thence pass through line 34 into receiver 35. Since the solvent and water are immiscible the condensate separates into two layers in receiver 35. The upper solvent layer may be withdrawn from the system through line 36 or preferably returned for reuse by passing through line 37 into solvent tank 5. The lower water layer may be sent through line 38 to sewer, or if desired returned through lines 39—31 into still 27 for further use as a granule protective medium. In this manner water economy is effected and, perhaps more important, small amounts of hydrocarbons frequently contained in the water layer are recovered by returning to still 27. After termination of vaporization, residual water remaining in still 27 is drained from the bottom of the still through line 41. The advantage of employing a perforate plate 28 in the particular arrangement of still as shown in the drawing is apparent since it eliminates the necessity of a separate operation for draining water from the solvent-free granular solids.

The resultant solvent-free granular product composed of hardened grains containing some moisture is then subjected to drying in any suitable manner, as for example by transferring the solvent-free granular product from still 27 through line 42 into a rotary dryer 43 wherein the granules are heated to a temperature of about 100–110° C. in order to evaporate off the contained moisture. Drying must be carried out at a sufficiently low temperature to avoid fusion of the granular material. The dried grain is free-flowing and free from dust and feeds freely through feed chutes and hoppers into automatic tableting machines and briquette presses.

If the final activated product is to be used for decolorizing, deodorizing, or water purification purposes, no further granulation, grinding, or graining operations are required and the dried granular product may be transported via lines 44 and 45 into calciner 46. In fact, drying equipment 43 may be entirely eliminated and the granular carbonaceous solids passed directly through lines 47 and 45 into calciner 46 wherein drying will occur as part of the calcining operation.

If the final activated product is to be used for gas absorption or solvent recovery operations it may be desirable to first dry the granular solids from still 27 in the manner previously described in connection with dryer 43. The dried granules from dryer 43 are transferred through line 48 to a conventional compressing machine 49 wherein the granules are briquetted at pressures ranging from 5000 to 50,000 pounds per square inch, depending upon the physical structure and density desired in the ultimate product. The briquettes from press 49 are passed through line 51 to conventional crusher 52 wherein they are ground and the ground briquettes then go through line 53 to oscillating screen 54 for sizing to the desired sized material, for example to through 4 on 16 mesh. The sized material from screen 54 is then conveyed through lines 55 and 45 to calciner 46.

Charring is effected by subjecting the granular carbonaceous material to controlled heating and oxidizing conditions. Calcining is ordinarily carried out in an externally heated retort, although heating by direct contact with suitable hot gases may be employed. Satisfactory apparatus may comprise a rotary, externally heated retort provided on the inside with agitating flights, equipped on one end with gas outlet 56, and on the opposite end with gas inlet 57 connected with a suitable metering device and valves so that controlled quantities of an oxidizing gas may be passed through the retort during the heating operation.

Since the carbonaceous material undergoing calcination is markedly susceptible to fusion, great care must be exercised throughout the charring operation as a whole and particularly during the preliminary stages thereof. Local overheating should be guarded against since if any of the material is once fused, that portion of the batch is no longer susceptible to activation and either a very low grade of active carbon is produced or the entire batch must be discarded. Prevention of local overheating is largely effected by constant agitation and the passage of gas through the retort throughout the charring run. As the charring constitutes a selective oxidation, it is also necessary to supply oxygen to the retort.

It has been found that adequate amounts of inert gas and oxygen may be supplied to the charring step by passing through the retort, all during the charring stage, a stream of air at a rate within the range of about 1.5–7.5 cubic feet per 100 pounds of material per minute. Utilizing such quantities of air, the oxygen content thereof, i. e. within the range of about 0.3–1.5 cubic feet per 100 pounds of material per minute, is satisfactory to supply the needed oxygen. Further, the quantity of inert gas in the air along with the oxygen content thereof is enough to maintain in the retort a moving gas stream of sufficient total volume to remove the heat of reaction from the mass. While it is preferred to utilize air in the manner stated as the oxidizing-cooling medium, in place of air, gas containing adequate quantities of free oxygen and inert gas may be employed. When using oxidizing gas other than air or its equivalent, for example, flue gas, such latter gases may contain from 5% to 25% by volume free oxygen, balance inert.

At the beginning of charring, when the granular material is particularly susceptible to fusion, temperatures in the retort are held low. Initially, no portions of the material are heated to temperatures exceeding about 50° C. below the melting point of the material being processed. Preferably, initially no portions of the material are heated to temperature as high as 200° C. Thus, in the preliminary heating the granular material is heated at gradually increasing temperatures from below 200° C., preferably from below 150° C., to within the range of 200°–400° C. and in the presence of oxygen-containing gas. It has been found that the temperature need not be increased greatly above 200° C., good results having been obtained with maximum temperature of 250° C. in situations in which the time interval of heating is sufficiently extended. In any event, the temperature should not be permitted to exceed 450° C. Duration of heating at temperature above 200° C. may vary from 2 to 8 hours. Calcination of the granular, fusible materials is carried out under the conditions of heating just described until there is obtained an infusible char without permitting fusion of the granules or leaving incompletely reacted and fusible residues. The calcined material is then transferred from calciner 46 through line 58 into activator 59, which may be any suitable retort conventional in the art. The charred materials may be finally activated by subjecting them to the action of steam or flue gases entering line 61 and discharging through outlet 62, by known procedures, while maintaining temperatures of the general order of 800°–1200° C. The activated carbon is discharged from activator 59 through discharge line 63.

Filtrate from centrifuges 8 and 19 comprises a liquor of soluble hydrocarbons and solvent. For the purpose of separating the solvent from the hydrocarbons, a conventional still 13 and fractionating column 64 of the usual bubble cap type or packed tower type may be employed. Filtrate enters still 13 through line 12, wherein it is subjected to distillation by the introduction of live steam through line 65. Evolved vapors consisting primarily of solvent, water vapor and small amounts of soluble hydrocarbons pass upwardly from still 13 through vapor line 66 into the bottom of column 64, wherein, they are subjected to fractionation. Heavy reflux is returned from the bottom column 64 through line 67 into still 13. Vapors leaving the top of fractionating column 64 and consisting primarily of solvent and water pass through line 68 into condenser 69 and the condensate therefrom flows through line 71 into receiver 72, wherein it separates into an upper solvent layer, which is returned to solvent tank 5 through line 73 for further use in the system, and a lower layer, which is withdrawn from the bottom of receiver 72 through line 74 and discarded.

The following examples are illustrative of the present invention:

Example 1

A flaked coal tar fuel pitch obtained by vacuum distillation of coke oven tar and having a softening point (cube-in-air method) of 160° C. was admixed with three volumes of toluol and the mixture digested under constant agitation for two hours at a temperature of 90°–95° C. The digested mixture was centrifuged and the resultant filter cake was reslurried by mixing it with an additional three volumes of toluol for 1½ hours at a temperature of about 90° C. The reslurry mixture was then centrifuged and the resulting filter cake was a pulverulent material containing approximately 30% by weight of occluded wash liquor.

This latter moist filter cake was pressed through a No. 6 sieve and thereby formed into irregularly shaped granules of substantially uniform size. These granules were placed in a vessel having a perforated plate located just above its bottom, and to the granules in the vessel were added ten volumes of water per volume of granules. Heat was gradually applied by means of a closed steam coil in the vessel to the water-granule mixture with continuous, slow agitation until the mixture reached a boiling point of 100° C. Heating was continued at that temperature until analyses of samples of the distillate being removed showed samples to be water substantially free from solvent whereupon distillation was discontinued. During distillation the evolved vapors were condensed and collected in a receiver, wherein the condensate separated into a lower water layer and an upper solvent layer. The residue remaining in the still was a mixture of hardened granules substantially free from solvent and completely surrounded by the water. The excess water was then drained from the bottom of the still leaving behind granules slightly moistened with water.

The moist granules free from solvent were then transferred to a horizontal drying vessel, wherein they were heated to a temperature of about 90°–100° C. until the moisture was evaporated. The dry grains were hard and firm and no disintegration or dusting was apparent. The hardened, dried granules were then subjected to selective oxidation in a rotary retort equipped with internal flights. Air was charged into the retort in contact with the granules at a rate of about six cubic feet per 100 pounds of material per minute. Heating by the furnace was controlled so that the temperature of the material rose to about 200° C. in 1½ hours and then was raised to 300° C. during about 3½ hours. The temperature of the material was finally raised to slightly below 400° C. over a period of about 1½ hours. The total heating time above about 200° C. was five hours.

The resulting granules were then transferred to another retort, wherein steam was passed in contact with the granules at a temperature of about 975° C. until the granules were activated in accordance with well established practice.

The thus activated carbon granules were of such activity that 0.25 gram adsorbed 95% of the iodine from 100 ml. of a standard test solution containing 2.70 grams of iodine per liter.

Example 2

A portion of the dry solvent-free granules obtained in Example 1 was briquetted at 20,000 pounds per square inch and then granulated to 10–20 mesh size. The granulated material was calcined in a rotary retort as described in Example 1 by passing air therethrough at the rate of 6 cubic feet per 100 pounds of material per minute. The temperature of the granulated material in the retort was first raised to 200° C. in 1½ hours and the temperature then gradually increased to about 400° C. over a period of about 5 hours. The resultant char was activated by passing steam therethrough at 975° C.

The activated carbon had a bulk density for the 10–20 mesh grain of 0.400 gram per cubic centimeter. When pulverized to pass the 200 mesh sieve and tested by the iodine adsorption method, it was found to be of such activity that 0.25 gram adsorbed 93.5% of iodine from 100 ml. of the standard test solution.

The thus activated grain was also subjected to the carbon tetrachloride test described by Fieldener et al., Industrial and Engineering Chemistry, vol. 11, 519 (1919). The service time of 19 minutes and carbon tetrachloride capacity of 1.02 grams per gram of carbon show it to be an excellent adsorbent for use in gas masks, solvent recovery system, etc.

Example 3

A molten water gas tar fuel pitch having a softening point (cube-in-air method) of about 150° C. was cut back with about an equal volume of solvent naphtha. A smooth, homogeneous solution resulted. This cutback pitch solution was then cooled to about 90° C. and an additional two volumes of solvent at 90° C. was added thereto while stirring continuously. This dilution effected a separation of the pitch into a finely divided suspensoid of insoluble hydrocarbons and a liquor of the more soluble components in the solvent. The slurry was filtered and the precipitated component obtained as a filter cake analyzing about 65% benzol-insoluble hydrocarbons and about 35% benzol-soluble hydrocarbons. Reslurrying the filter cake in an additional 3 volumes of xylol, agitating for one hour at 90° C. and again filtering gave a cake which, after solvent elimination, analyzed 78% benzol-insoluble hydrocarbons. The solvent content of this cake was about 30% by weight of the wet cake.

The solvent-wet cake was granulated by pressing it through a 14 mesh sieve to form irregularly-shaped grains of relatively uniform size. These grains were placed in a distilling vessel having a screen suspended above the bottom thereof and water amounting to about five times the volume of the grain was added. When the water was heated to boiling, a mixed distillate of solvent and water was collected. After the solvent content of an incremental distillate sample was found on inspection to be negligible, the water was withdrawn from the vessel leaving the water-wet, substantially solvent-free grain on the screen surface. Live steam was passed through the apparatus to completely eliminate solvent residues and to vaporize the residual water, the degree of superheat in the steam being such as to attain a temperature of 125–150° C. in the grain. The thus substantially solvent- and water-free grain was discharged directly to the calciner for processing as in Example 1.

*Example 4*

A crude coke oven tar was diluted with 30% by weight of xylol, heated with agitation to 100° C., and filtered by centrifuging. The resultant filter cake was slurried with an equal volume of hot solvent and refiltered. The solvent-wet filter cake was granulated by pressing it through a 14 mesh sieve. After removal of the solvent by the procedure described in Example 3, a free-flowing, dust-free grain was obtained which fed smoothly and uniformly into an automatic tabletting press wherein it was converted into tablets having a specific gravity of 1.20. These tablets were subsequently crushed to grain of 10–20 mesh size for processing by the selective oxidation, calcining and steam activation procedures as described in Example 1.

*Example 5*

A solvent-wet filter cake containing 35% of Hi-Flash solvent was put in a Carver oil press and subjected to a pressure of 1500 p. s. i. Excess liquor was expressed from the mass. The compressed mass was then granulated and the granules passing 10 mesh and retained on the 20 mesh were charged to a still containing water. The water-solids mixture was heated to boiling and boiling continued for about 20 minutes. The residual water was then filtered off and, after drying, a strong grain, substantially free of dust, resulted. The bulk density of this dried grain was 0.540 gram per cubic centimeter as compared with 0.475 for the grain produced by screen granulation of unconsolidated cake. The foregoing illustrates the effect of precompressing the filter cake prior to granulation.

*Example 6*

A crude oil-gas tar was diluted with xylol in the proportion of one volume of solvent to two of tar. After filtering off the soluble components, the filter cake was washed with an additional volume of solvent and again filtered. The resultant liquor-wet filter cake was formed into briquettes in a Carver oil press at 3000 p. s. i., the resultant briquettes having a wet density of 1.26 grams per cubic centimeter and a solvent content of 21%. After crushing and grading to 10–20 mesh size, the grain was charged to a vessel equipped with an agitator containing water in an amount sufficient to completely cover the charge of grain. The water was heated to boiling, and boiling continued until the distillate was substantially free of solvent. Excess water was drained from the vessel and grain slightly moistened with water, then dried. The dried grain was hard and strong and had a bulk density of 0.622 gram per cubic centimeter, and after calcination, as in Example 1, the grain was steam activated at 975° C. The activated carbon product had an iodine value of 88%.

Although certain preferred embodiments of the invention have been disclosed for purposes of illustration, it will be evident that various changes and modifications may be made therein without departing from the scope and spirit of the invention.

I claim:

1. A method for the treatment of heavy hydrocarbon material of the group consisting of a pyrogenous hydrocarbon condensate resulting from the destructive distillation of coals and a pyrogenous hydrocarbon condensate resulting from the pyrolysis of petroleum at high temperatures to produce predominantly gas, which comprises mixing a predominantly aromatic solvent with the heavy hydrocarbon material, separating pulverulent carbonaceous solid materials insoluble in the mixture from the liquor, said separated carbonaceous solids containing occluded liquor, granulating the carbonaceous solids, adding to the granular solids a large amount of water sufficient upon subsequent heating of the solids-water mixture to pass off as vapors with occluded liquor and leave behind as residue the solids surrounded by liquid water, heating the solids-water mixture to a temperature not substantially in excess of 100° C. to effect vaporization of occluded liquor and concomitantly a portion of the contained water, terminating the vaporization after substantially all the occluded liquor has been removed from the solids but before all the water has been vaporized therefrom, separating water from the solids-water residue, and calcining the solids until an infusible activatable char is obtained.

2. A method for the treatment of heavy hydrocarbon material of the group consisting of a pyrogenous hydrocarbon condensate resulting from the destructive distillation of coals and a pyrogenous hydrocarbon condensate resulting from the pyrolysis of petroleum at high temperatures to produce predominantly gas, which comprises mixing a solvent with the heavy hydrocarbon material, separating pulverulent carbonaceous solid materials insoluble in the mixture from the liquor, said separated carbonaceous solids containing occluded liquor, granulating the liquor-wet solids, adding to the granular liquor-wet solids an amount of water sufficient to completely envelop the individual grains of granular liquor-wet solids, heating the solids-water mixture to a temperature not substantially in excess of 100° C. to effect vaporization of at least a major portion of the liquor and thereby render the grain hard and non-coalescent and of higher fusion point, maintaining the individual grains completely enveloped by water during said vaporization of liquor, and calcining the solids until an infusible activatable char is obtained.

3. A method for the treatment of heavy hydrocarbon material of the group consisting of a pyrogenous hydrocarbon condensate resulting from the destructive distillation of coals and a pyrogenous hydrocarbon condensate resulting from the pyrolysis of petroleum at high temperatures to produce predominantly gas, which comprises mixing a predominantly aromatic solvent with the heavy hydrocarbon material, separating pulverulent carbonaceous solid materials insoluble in the mixture from the liquor, washing the solids with a solvent immiscible with water, separating the washed solids from the wash liquor, granulating the solvent-wet solids, adding to the granular solvent-wet solids an amount of water sufficient to completely envelop the individual grains of granular solvent-wet solids, heating the solids-water mixture to a temperature not substantially in excess of 100° C. to effect vaporization of at least a major portion of the solvent and thereby render the grain hard and non-coalescent and of higher fusion point, maintaining the individual grains completely enveloped by water during said vaporization of solvent, condensing the evolved vapors resulting from the heating of the solids-water mixture, and calcining the solids until an infusible activatable char is obtained.

4. A method for the treatment of heavy hydrocarbon material of the group consisting of a pyrogenous hydrocarbon condensate resulting from the destructive distillation of coals and a pyrogenous hydrocarbon condensate resulting from the pyrolysis of petroleum at high temperatures to produce predominantly gas, which comprises mixing a predominantly aromatic solvent with the heavy hydrocarbon material, separating pulverulent carbonaceous solid materials insoluble in the mixture from the liquor, washing the solids with a solvent immiscible with water, separating the washed solids from the wash liquor, granulating the solvent-wet solids, adding to the granular solvent-wet solids a large amount of water sufficient upon subsequent heating of the solids-water mixture to pass off as vapor with occluded solvent and leave behind as residue the solids surrounded by liquid water, heating the solids-water mixture to a temperature not substantially in excess of 100° C. to effect vaporization of occluded solvent and concomitantly a portion of the contained water, terminating the vaporization after substantially all the occluded solvent has been removed from the solids but before all the water has been vaporized therefrom, condensing and collecting the evolved vapors resulting from the heating of the solids-water mixture, separating water from the solids-water residue, and calcining the resultant solids until an infusible activatable char is obtained.

5. A method for the treatment of heavy hydrocarbon material of the group consisting of a pyrogenous hydrocarbon condensate resulting from the destructive distillation of coals and a pyrogenous hydrocarbon condensate resulting from the pyrolysis of petroleum at high temperatures to produce predominantly gas, which comprises mixing a solvent with the heavy hydrocarbon material, separating pulverulent carbonaceous solid materials insoluble in the mixture from the liquor, washing the solids with a solvent immiscible with water, separating the washed solids from the wash liquor, granulating the solvent-wet solids, adding to the granular solvent-wet solids an amount of water sufficient to completely envelop the individual grains of granular solvent-wet solids, heating the solids-water mixture to a temperature not substantially in excess of 100° C. to effect vaporization of at least a major portion of the solvent and thereby render the grain hard and non-coalescent and of higher fusion point, maintaining the individual grains completely enveloped by water during said vaporization of solvent, condensing and collecting the evolved vapors resulting from the heating of the solids-water mixture, separating the condensate into an upper solvent layer and a lower water layer, returning the solvent layer for admixture with heavy hydrocarbon material, returning the water layer for admixture with granular solvent-wet solids, and calcining the resultant solids until an infusible activatable char is obtained.

6. A method for the treatment of heavy hydrocarbon material of the group consisting of a pyrogenous hydrocarbon condensate resulting from the destructive distillation of coals and a pyrogenous hydrocarbon condensate resulting from the pyrolysis of petroleum at high temperatures to produce predominantly gas, which comprises mixing a solvent with the heavy hydrocarbon material, separating pulverulent carbonaceous solid materials insoluble in the mixture from the liquor, washing the solids with a solvent immiscible with water, separating the washed solids from the wash liquor, granulating the solvent-wet solids, adding to the granular solvent-wet solids an amount of water sufficient to completely envelop the individual grains of granular solvent-wet solids, heating the solids-water mixture to a temperature not substantially in excess of 100° C. to effect vaporization of at least a major portion of the solvent and thereby render the grain hard and non-coalescent and of higher fusion point, maintaining the individual grains completely enveloped by water during said vaporization of solvent, condensing and collecting the evolved vapors resulting from the heating of the solids-water mixture, separating water from the solids-water residue, drying the solids separated from water at a temperature below fusion of the grains, briquetting the dry solids at pressures within the range of 5,000 to 50,000 lbs. per square inch, grinding and granulating the briquettes to about 10-20 mesh size, heating the ground granular briquettes in the presence of oxygen-containing gas at temperatures sufficiently high to char the solids while maintaining the temperature sufficiently low during such heating so that at least a substantial proportion of the granular solid remains in an unfused condition, and continuing heating of the granular solids until an infusible activatable char is obtained.

7. A method for the treatment of pulverulent benzol-insoluble solid material containing occluded liquor and derived from a heavy hydrocarbon material of the group consisting of a pyrogeneous hydrocarbon condensate resulting from the destructive distillation of coals and a pyrogenous hydrocarbon condensate resulting from the pyrolysis of petroleum at high temperatures to produce predominantly gas, which comprises granulating the solid material containing occluded liquor, adding to the granular solids an amount of water sufficient to completely envelop the individual grains of the granular solids, heating the solids-water mixture to a temperature not substantially in excess of 100° C. to effect vaporization of at least a major portion of the liquor and thereby render the grain hard and non-coalescent and of higher fusion point, maintaining the individual grains completely enveloped by water during said vaporization of liquor, and calcining the solids until an infusible activatable char is obtained.

8. A method for the treatment of pulverulent benzol-insoluble solid material containing occluded liquor and derived from a pyrogenous hydrocarbon condensate resulting from the destructive distillation of coals, which comprises granulating the solid material containing occluded liquor, adding to the granular solids an amount of water sufficient to completely envelop the individual garins of the granular solids, heating the solids-water mixture to a temperature not substantially in excess of 100° C. to effect vaporization of at least a major portion of the liquor and thereby render the grain hard and non-coalescent and of higher fusion point, maintaining the individual grains completely enveloped by water during said vaporization of liquor, and calcining the solids until an infusible activatable char is obtained.

9. A method for the treatment of pulverulent benzol-insoluble solid material containing occluded liquor and derived from a pyrogenous hydrocarbon condensate resulting from the pyrolysis of petroleum at high temperatures to produce predominantly gas, which comprises granulating the solid material containing occluded liquor, adding to the granular solids an amount of water sufficient to completely envelop the individual grains of the granular solids, heating the solids-water mixture to a temperature not substantially in excess of 100° C. to effect vaporization of at least a major portion of the liquor and thereby render the grain hard and non-coalescent and of higher fusion point, maintaining the individual grains completely enveloped by water during said vaporization of liquor, and calcining the solids until an infusible activatable char is obtained.

10. A method for the treatment of pulverulent benzol-insoluble solid material containing occluded liquor and derived from a heavy hydrocarbon material of the group consisting of a pyrogenous hydrocarbon condensate resulting from the destructive distillation of coals and a pyrogenous hydrocarbon condensate resulting from the pyrolysis of petroleum at high temperatures to produce predominantly gas, which comprises washing the solids containing occluded liquor with a solvent immiscible with water, separating the resultant solids containing occluded solvent from the wash liquor, granulating the solvent-wet solids, adding to the granual solvent-wet solids a large amount of water sufficient upon subsequent heating of the solids-water mixture to pass off as vapors with occluded solvent and leave behind as residue the solids surrounded by liquid water, heating the solids-water mixture to a temperature not substantially in excess of 100° C. to effect vaporization of occluded solvent and concomitantly a portion of the contained water, terminating the vaporization after substantially all the occluded liquor has been removed from the solids but before all the water has been vaporized therefrom, condensing and collecting the evolved vapors resulting from the heating of the solids-water mixture, draining water from the water-solids residue after vaporization of solvent therefrom, drying the solids drained of water at a temperature not substantially in excess of 100° C., heating the dried solids in the presence of oxygen-containing gas at a temperature sufficiently high to char the solids while maintaining the temperature sufficiently low during such heating so that at least a substantial proportion of the solid remains in an unfused condition, and continuing heating of the solids until an infusible activatable char is obtained.

11. A method for the treatment of heavy hydrocarbon material of the group consisting of a pyrogenous hydrocarbon condensate resulting from the destructive distillation of coals and a pyrogenous hydrocarbon condensate resulting from the pyrolysis of petroleum at high temperatures to produce predominantly gas, which comprises mixing a predominantly aromatic solvent with the heavy hydrocarbon material, separating pulverulent carbonaceous solid materials insoluble in the mixture from the liquor, said separated carbonaceous solids containing occluded liquor, compressing the carbonaceous solids, granulating the compressed carbonaceous solids, adding to the granular solids a large amount of water sufficient upon subsequent heating of the solids-water mixture to pass off as vapors with occluded liquor and leave behind as residue the solids surrounded by liquid water, heating the solids-water mixture to a temperature not substantially in excess of 100° C. to effect vaporization of occluded liquor and concomitantly a portion of the contained water, terminating the vaporization after substantially all the occluded liquor has been removed from the solids but before all the water has been vaporized therefrom, separating water from the solids-water residue, and calcining the solids until an infusible activatable char is obtained.

12. A method for the treatment of heavy hydrocarbon material of the group consisting of a pyrogeneous hydrocarbon condensate resulting from the destructive distillation of coals and a pyrogenous hydrocarbon condensate resulting from the pyrolysis of petroleum at high temperatures to produce predominantly gas, which comprises mixing a solvent with the heavy hydrocarbon material, separating pulverulent carbonaceous solid materials insoluble in the mixture from the liquor, said separated carbonaceous solids containing occluded liquor, compressing the carbonaceous solids, granulating the compressed solids, adding to the granular solids an amount of water sufficient to completely envelop the individual grains of granular solids, heating the solids-water mixture to a temperature not substantially in excess of 100° C. to effect vaporization of at least a major portion of the liquor and thereby render the grain hard and non-coalescent and of higher fusion point, maintaining the individual grains completely enveloped by water during said vaporization of liquor and calcining the solids until an infusible activatable char is obtained.

13. In the production of granular carbonaceous solid activatable to activated carbon from a soft, easily fusible pulverulent and coalescible mass of benzol-insoluble activatable carbonaceous solid and occluded liquor the steps of compressing the solid containing occluded liquor into granules, adding to the granules water in an amount sufficient to completely envelop the same, vaporizing liquor from said granules while maintaining them enveloped in water until at least a major portion of the liquor has been evaporated to render the granules hard and non-coalescent and of higher fusion point, and calcining the granules until an infusible activatable char is obtained.

JOSEPH W. DONEGAN.

REFERENCES CITED

The following references are of record in the file of this patent:

UNITED STATES PATENTS

| Number | Name | Date |
|---|---|---|
| 2,454,941 | Pierce et al. | Nov. 30, 1948 |
| 2,549,298 | Donegan | Apr. 17, 1951 |